(12) United States Patent
Ozcan et al.

(10) Patent No.: US 12,578,679 B2
(45) Date of Patent: ***Mar. 17, 2026

(54) DIFFRACTIVE OPTICAL NETWORK FOR RECONSTRUCTION OF HOLOGRAMS

(71) Applicant: THE REGENTS OF THE UNIVERSITY OF CALIFORNIA, Oakland, CA (US)

(72) Inventors: Aydogan Ozcan, Los Angeles, CA (US); Md Sadman Sakib Rahman, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 916 days.

This patent is subject to a terminal disclaimer.

(21) Appl. No.: 17/865,361

(22) Filed: Jul. 14, 2022

(65) Prior Publication Data

US 2023/0024787 A1 Jan. 26, 2023

Related U.S. Application Data

(60) Provisional application No. 63/222,849, filed on Jul. 16, 2021.

(51) Int. Cl.
G03H 1/08 (2006.01)
G02B 27/42 (2006.01)
G06N 3/067 (2006.01)

(52) U.S. Cl.
CPC ....... G03H 1/0808 (2013.01); G02B 27/4277 (2013.01); G06N 3/067 (2013.01); *G03H 2001/0825* (2013.01)

(58) Field of Classification Search
CPC ......... G03H 1/0808; G03H 2001/0825; G03H 2001/0224; G03H 2001/221;

(Continued)

(56) References Cited

U.S. PATENT DOCUMENTS

2021/0014217 A1    1/2021  Wei et al.
2022/0327371 A1*  10/2022  Ozcan ................ G02B 27/4277
(Continued)

FOREIGN PATENT DOCUMENTS

WO    WO 2020/247828    12/2020
WO    WO 2021/050550     3/2021
(Continued)

OTHER PUBLICATIONS

Mart'in Abadi et al., TensorFlow: A system for large-scale machine learning, USENIX Association, 12th USENIX Symposium on Operating Systems Design and Implementation, Nov. 2-4, 2016, (21 pages).

(Continued)

*Primary Examiner* — Vijay Shankar
(74) *Attorney, Agent, or Firm* — VISTA IP LAW GROUP LLP

(57) ABSTRACT

An all-optical hologram reconstruction system and method is disclosed that can instantly retrieve the image of an unknown object from its in-line hologram and eliminate twin-image artifacts without using a digital processor or a computer. Multiple transmissive diffractive layers are trained using deep learning so that the diffracted light from an arbitrary input hologram is processed all-optically to reconstruct the image of an unknown object at the speed of light propagation and without the need for any external power. This passive diffractive optical network, which successfully generalizes to reconstruct in-line holograms of unknown, new objects and exhibits improved diffraction efficiency as well as extended depth-of-field at the hologram recording distance. The system and method can find numerous applications in coherent imaging and holographic display-related applications owing to its major advantages in (Continued)

terms of image reconstruction speed and computer-free operation.

17 Claims, 11 Drawing Sheets

(58) Field of Classification Search
CPC ......... G03H 2001/261; G03H 2223/12; G03H 2223/13; G03H 2223/23; G03H 2225/60; G03H 1/2205; G02B 27/0944; G02B 5/1866; G02B 6/4206; G02B 27/4277; G02B 5/1857; G06N 3/067; G06N 3/084; G06N 3/0985
See application file for complete search history.

(56) References Cited

U.S. PATENT DOCUMENTS

| | | | | |
|---|---|---|---|---|
| 2023/0368012 A1* | 11/2023 | Yu | ............................ | G02B 5/18 |
| 2024/0288701 A1* | 8/2024 | Ozcan | .................. | G02B 6/4206 |
| 2024/0414428 A1* | 12/2024 | Takatsuka | .............. | H04N 23/61 |
| 2025/0172907 A1* | 5/2025 | Stafford | ............... | G03H 1/0244 |
| 2025/0200351 A1* | 6/2025 | Spall | ...................... | G06N 3/084 |

FOREIGN PATENT DOCUMENTS

| | | |
|---|---|---|
| WO | WO 2021/231139 | 11/2021 |
| WO | WO 2021/237170 | 11/2021 |
| WO | WO 2022/006018 | 1/2022 |
| WO | WO 2022/056422 | 3/2022 |
| WO | WO 2022/087345 | 4/2022 |

OTHER PUBLICATIONS

George Barbastathis et al., On the use of deep learning for computational imaging, Optica, vol. 6, No. 8, Aug. 2019, 921-943.

Mo Deng et al., Learning to synthesize: robust phase retrieval at low photon counts, Light: Science & Applications (2020) 9:36.

D. Gabor et al., A New Microscopic Principle, Nature, May 15, 1948, No. 4098, vol. 161, 777-778.

Alexandre Goy et al., Low Photon Count Phase Retrieval Using Deep Learning, Phys. Rev. Lett. 121, 243902—Published Dec. 12, 2018.

Alon Greenbaum et al., Maskless imaging of dense samples using pixel super-resolution based multi-height lensfree on-chip microscopy, Optics Express, Jan. 30, 2012, vol. 20, No. 3, 3129-3143.

Luzhe Huang et al., Holographic Image Reconstruction with Phase Recovery and Autofocusing Using Recurrent Neural Networks, ACS Photonics 2021, 8, 1763-1774.

Diederik P. Kingma et al., Adam: A Method For Stochastic Optimization, Published as a conference paper at ICLR 2015; arXiv:1412.6980v9 [cs.LG] Jan. 30, 2017.

Onur Kulce et al., All-optical information-processing capacity of diffractive surfaces, Light: Science & Applications (2021) 10:25.

Emmett N. Leith et al., Wavefront Reconstruction with Continuous-Tone Objects, Journal of the Optical Society of America, vol. 53, No. 12, Dec. 1963, 1377-1381.

Jingxi Li et al., Spectrally encoded single-pixel machine vision using diffractive networks, Sci. Adv., 2021; 7: eabd7690 Mar. 26, 2021 (12 pages).

Xing Lin et al., All-Optical Machine Learning Using Diffractive Deep Neural Networks, (2018) (20 pages).

Yi Luo et al., Design of task-specific optical systems using broadband diffractive neural networks, Light: Science & Applications ( 2019) 8:112.

Deniz Mengu et al., Analysis of Diffractive Optical Neural Networks and Their Integration With Electronic Neural Networks, IEEE Journal of Selected Topics in Quantum Electronics, vol. 26, No. 1, Electronics, vol. 26, No. 1, Jan./Feb. 2020, 3700114.

Deniz Mengu et al., Scale-, shift- and rotation-invariant diffractive optical networks, ACS Photonics (2021) (28 pages).

Deniz Mengu et al., Misalignment Resilient Diffractive Optical Networks, (2020) (15 pages).

Aydogan Ozcan et al., Lensless Imaging and Sensing, Annu. Rev. Biomed. Eng., 2016. 18:77-102.

Md Sadman Sakib Rahman et al., Ensemble learning of diffractive optical networks, Light: Science & Applications (2021) 10:14.

Zhenbo Ren et al., End-to-end deep learning framework for digital holographic reconstruction, Advanced Photonics, Jan./Feb. 2019, vol. 1(1), 016004-1-016004-12 (12 pages).

Yair Rivenson et al., Phase recovery and holographic image reconstruction using deep learning in neural networks, Light: Science & Applications (2018) 7, 17141; doi:10.1038/lsa.2017.141.

Yair Rivenson et al., Deep learning in holography and coherent imaging, Light: Science & Applications ( 2019) 8:85.

Yair Rivenson et al., PhaseStain: the digital staining of label-free quantitative phase microscopy images using deep learning, Light: Science & Applications ( 2019) 8:23.

Muhammed Veli et al., Terahertz pulse shaping using diffractive surfaces, Nature Communications, (2021), 12:37, https://doi.org/10.1038/s41467-020-20268-z, www.nature.com/naturecommunications.

Hao Wang et al., eHoloNet: a learning-based end-to-end approach for in-line digital holographic reconstruction, Optics Express, vol. 26, No. 18, Sep. 3, 2018, 22603-22614.

Kaiqiang Wang et al., Y-Net: a one-to-two deep learning framework for digital holographic reconstruction, Optics Letters, vol. 44, No. 19, Oct. 1, 2019, 4765-4768.

Yichen Wu et al., Extended depth-of-field in holographic imaging using deep-learning-based autofocusing and phase recovery, Optics, vol. 5, No. 6, Jun. 2018, 704-710.

Yichen Wu et al., Bright-field holography: cross-modality deep learning enables snapshot 3D imaging with bright-field contrast using a single hologram, Light: Science & Applications, (2019) 8:25.

Tianjiao Zeng et al., RedCap: residual encoder-decoder capsule network for holographic image reconstruction, Optics Express, vol. 28, No. 4, Feb. 17, 2020, 4876-4887.

* cited by examiner

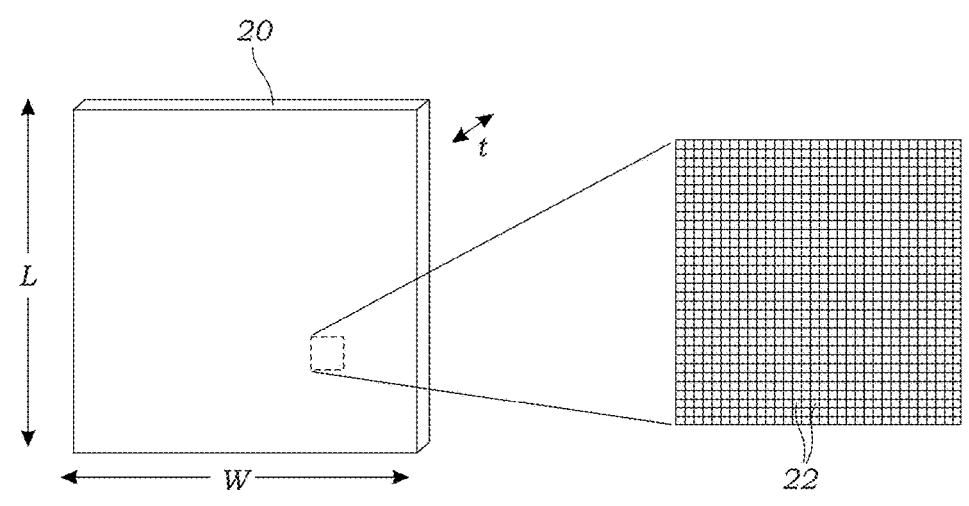
*FIG. 2*
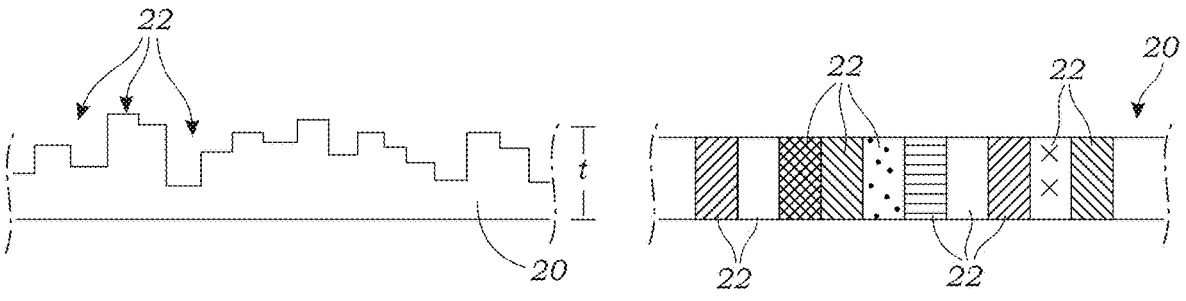
*FIG. 3*             *FIG. 4*
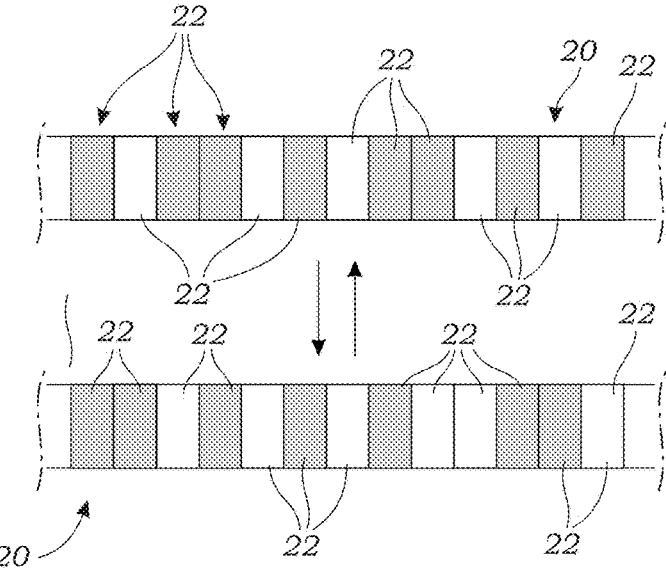
*FIG. 5*

DIFFRACTIVE OPTICAL NETWORK FOR RECONSTRUCTION OF HOLOGRAMS

RELATED APPLICATION

This Application claims priority to U.S. Provisional Patent Application No. 63/222,849 filed on Jul. 16, 2021, which is hereby incorporated by reference in its entirety. Priority is claimed pursuant to 35 U.S.C. § 119 and any other applicable statute.

TECHNICAL FIELD

The technical field generally relates to optical-based deep learning physical architectures or platforms that can perform various complex functions and tasks that current computer-based neural networks can implement. The optical deep learning physical architecture or platform has applications in the reconstruction of holograms. In particular, the technical field relates to such optical-based architectures and platforms that are trained that can reconstruct input holograms of unknown objects without suffering from twin-image artifacts.

BACKGROUND

Holography is a widely used technique with a myriad of applications in e.g., computational imaging, displays, interferometry and data storage. What distinguishes holography from other optical methods is its ability to record and reconstruct both the intensity and the phase of the object field of interest. For its recording, the object wave is made to interfere with a reference wave to generate an intensity pattern, i.e., the hologram, encoding both the amplitude and the phase information of the object wave. Holographic reconstruction broadly refers to the retrieval of the object information from the recorded hologram intensity. In the original hologram recording scheme demonstrated by Gabor, the so-called 'in-line holography,' the reference wave and the object wave co-propagate along the same axis. See D. Gabor, A New Microscopic Principle, Nature 161, 777-778 (1948). In its analog implementation, the recorded hologram (e.g., a photographic plate or its digital copy) can be illuminated with a reference wave and the object field can be partially recovered. Reconstruction of in-line holograms in general suffers from a spatial artifact known as the twin-image, which is due to the appearance of an out-of-focus image overlapping with the desired image of the object, degrading the reconstruction quality. To get rid of the twin-image problem, Leith and Upatnieks proposed an alternative hologram recording geometry, known as the "off-axis holography." See E. N. Leith and J. Upatnieks, "Wavefront Reconstruction with Continuous-Tone Objects*," JOSA 53, 1377-1381 (1963). In this scheme, a small angle is introduced between the reference wave and the object wave, resulting in a spatial separation of the twin-image from the desired image of the unknown object during the reconstruction process. However, in addition to the relatively increased complexity of the experimental setup, the achievable space-bandwidth product with off-axis holography is smaller. In fact, the simplicity and the experimental robustness of the recording geometry of in-line holograms make it ideal for various field-based measurements and applications that require compact and cost-effective imaging and sensing systems.

Powered by modern computers, the emergence of digital holography enabled the numerical reconstruction of holograms, exploiting the availability of phase retrieval algorithms for suppressing twin-image artifacts. Various phase-retrieval algorithms have been reported over the last several decades to recover the missing phase information and reconstruct an image of the specimen from one or more in-line holograms using a computer. As an alternative approach, deep learning-based hologram reconstruction methods have also been demonstrated, performing phase recovery and twin-image elimination using trained deep neural networks. Some of these earlier neural networks devised to blindly reconstruct an arbitrary hologram were trained with examples of holograms (input to the network) and the corresponding object fields (target ground truth). Although the data generation and the training process is time consuming (taking e.g., 12-24 h, depending on the availability of graphics processing units, GPUs), this is still a one-time effort, and once the neural network has been trained, it can be deployed to blindly reconstruct an input hologram of an unknown, new object, in a single feed-forward through the network, without any iterative phase retrieval or optimization steps. This constitutes one of the important advantages of deep learning-based hologram reconstruction methods, in addition to enabling some other unique imaging capabilities such as e.g., extended depth-of-field and virtual image transformations. All of this earlier body of work is based on digital processing of the acquired holograms through a computer in order to reconstruct the images of unknown objects.

SUMMARY

In one embodiment, an all-optical hologram reconstruction method/system is disclosed that processes the diffracted wave from a holographic recording through a series of transmissive and/or reflective diffractive layers that collectively project an image of the unknown object at an output plane. These diffractive layers are designed through deep learning to specifically reconstruct input (e.g., in-line) holograms, and form a passive optical network that can execute a desired task between an input and output plane without an external power source, except for the illumination light at a wavelength of $\lambda$. The input optical field of a diffractive network is transformed via light-matter interactions and diffraction through (or reflected off) the spatially-engineered layers to produce the target field at its output plane, dictated by the inference task that is statistically learned. In addition to computing the desired output field at the speed of light propagation (between the input and output planes), this diffractive network architecture also exploits the large connectivity and parallelism of free-space optical diffraction and the advantages of layer-by-layer optical processing.

In one particular implementation of such a system, by training five (5) successive diffractive layers using deep learning, the design of an all-optical processor is presented, in the form of a passive diffractive optical network extending only ~225$\lambda$ in the axial direction, that can reconstruct the image of an unknown object from its intensity hologram without the need for any digital computation or an external power source. The designed diffractive networks can generalize very well to unseen examples and accurately reconstruct their images at the speed of light propagation, also exhibiting an enhanced diffraction efficiency as well as an improved depth-of-field at the hologram recording distance. This all-optical hologram processor will find various applications in holographic imaging and display related applications, especially benefiting from its computer-free and instantaneous image reconstruction capability.

In one embodiment, a method of forming a physical embodiment of a diffractive optical network that reconstructs input holograms to reveal accurate optical images, optical signals, or optical data includes the operations of: training with at least one computing device a diffractive optical network model formed by one or more diffractive layers to reconstruct at least one optical image, optical signal, or optical data input to the diffractive optical network as one or more holograms, the one or more diffractive layers having a plurality of optically transmissive and/or optically reflective physical features located in different locations therein or thereon, wherein the training comprises feeding an input plane of the diffractive optical network model with training holograms of optical images, optical signals, or optical data and computing an optical output of the diffractive optical network model through optical transmission and/or reflection resulting from the one or more diffractive layers and iteratively adjusting transmission and/or reflection properties for the one or more diffractive layers of the diffractive optical network model until optimized transmission/reflection coefficients are obtained to reconstruct the at least one optical image, optical signal, or optical data from the hologram(s) input to the diffractive optical network model, wherein the at least one optical image, optical signal, or optical data that is/are reconstructed is/are substantially free of twin-image noise or artifacts. After training, a physical embodiment of the diffractive optical network model is then manufactured or fabricated that includes one or more transmissive and/or reflective diffractive layers having physical features that match the optimized transmission/reflection coefficients obtained by the training of the diffractive optical network model.

In another embodiment, a diffractive optical network that reconstructs input holograms to reveal accurate optical images, optical signals, or optical data includes one or more optically transmissive and/or reflective diffractive layers arranged in an optical path, each of the optically transmissive and/or reflective diffractive layer(s) comprising a plurality of physical features formed on or within the one or more optically transmissive and/or reflective diffractive layers and having different transmission and/or reflective properties as a function of local coordinates across each diffractive layer, wherein the one or more optically transmissive and/or reflective diffractive layers and the plurality of physical features thereon or therein collectively define a trained mapping function between (1) an input hologram containing at least one input optical image, input optical signal, or input optical data to the diffractive optical network and (2) at least one output optical image, output optical signal, or output optical data created from the one or more optically transmissive and/or reflective diffractive layers, the trained mapping function reconstructing the at least one input optical image, input optical signal, or input optical data that is/are substantially free of twin-image noise or artifacts and is/are projected onto an observation plane or surface and/or one or more optical detectors configured to see/reveal the at least one output optical image, output optical signal, or output optical data resulting from the diffractive optical network.

Note that in some embodiments, one or more layers of the diffractive optical network may comprise reconfigurable features such as, for example, spatial light modulators. The diffractive optical network may be incorporated into a portable electronic device such as, for example, glasses or goggles. The output of the diffractive optical network may be projected onto one or more detectors or on a surface or observation plane. The reconstructed output image, data, and/or signal is substantially free of twin-image noise or artifacts.

BRIEF DESCRIPTION OF THE DRAWINGS

FIG. 2 illustrates a single diffractive layer of a diffractive optical network. The diffractive layer may be made from a material that is optically transmissive (for transmission mode such as illustrated in FIG. 1A) or an optically reflective material (for reflective mode as illustrated in FIG. 1B). The diffractive layer, which may be formed as a substrate or plate in some embodiments, has surface features formed across the diffractive layer. The surface features form a patterned surface (e.g., an array) having different valued transmission (or reflection) properties as a function of lateral coordinates across each diffractive layer. These surface features act as artificial "neurons" that connect to other "neurons" of other diffractive layers of the diffractive optical network through optical diffraction (or reflection) and alter the phase and/or amplitude of the light wave.

FIG. 3 schematically illustrates a cross-sectional view of a single diffractive layer of a diffractive optical network according to one embodiment. In this embodiment, the surface features are formed by adjusting the thickness of the diffractive layer that forms the diffractive optical network. These different thicknesses may define peaks and valleys in the diffractive layer that act as the artificial "neurons."

FIG. 4 schematically illustrates a cross-sectional view of a single diffractive layer of a diffractive optical network according to another embodiment. In this embodiment, the different surface features are formed by altering the material composition or material properties of the single diffractive layer at different lateral locations across the diffractive layer. This may be accomplished by doping the diffractive layer with a dopant or incorporating other optical materials into the diffractive layer. Metamaterials or plasmonic structures may also be incorporated into the diffractive layer.

FIG. 5 schematically illustrates a cross-sectional view of a single diffractive layer of a diffractive optical network according to another embodiment. In this embodiment, the diffractive layer is reconfigurable in that the optical properties of the various artificial neurons may be changed, for example, by application of a stimulus (e.g., electrical current or field). An example includes spatial light modulators (SLMs) which can change their optical properties. In this embodiment, the neuronal structure is not fixed and can be dynamically changed or tuned as appropriate. This embodiment, for example, can provide a learning diffractive optical network or a changeable diffractive optical network that can be altered on-the-fly (e.g., over time) to improve the performance, compensate for aberrations, adjust for dynamic conditions (e.g., changing over time).

FIG. 7A: for hologram recording, the object is illuminated by a plane wave, and the resulting diffraction pattern is recorded, forming the hologram. FIG. 7B: for reconstruction, the hologram is illuminated with a plane wave, and the diffractive network all-optically computes a twin-image-free reconstruction at the output plane.

FIG. 10A: quantitative comparison of the robustness of the diffractive network reconstructions and free-space propagation-based reconstructions to deviations in the hologram recording axial distance. SSIM and PSNR of the diffractive network results remain acceptable over a wide range of hologram recording distance variations. This robustness can be further improved by incorporating such random deviations in the training phase, as illustrated by the curves corresponding to $\delta_{tr}=0.2$. These metrics (SSIM and PSNR) were computed over the 10,000 test images of MNIST dataset. FIG. 10B: visual comparison of the reconstructed images.

FIG. 11A: examples of all-optical holographic reconstructions by a high-efficiency diffractive network (with training hyperparameters: $\delta_{tr}=0.2$, $\eta=0.5$). For each panel in (FIG. 11A) corresponding to a recording $\delta z$, left: hologram, center: free-space propagation-based reconstruction, right: diffractive network reconstruction. FIG. 11B: SSIM vs. diffraction efficiency tradeoff achieved by tuning $\eta$ in the loss function. The two numbers below the reconstructed images correspond to the SSIM and the diffraction efficiency (%) of each reconstruction.

DETAILED DESCRIPTION OF ILLUSTRATED EMBODIMENTS

Figure 1A:
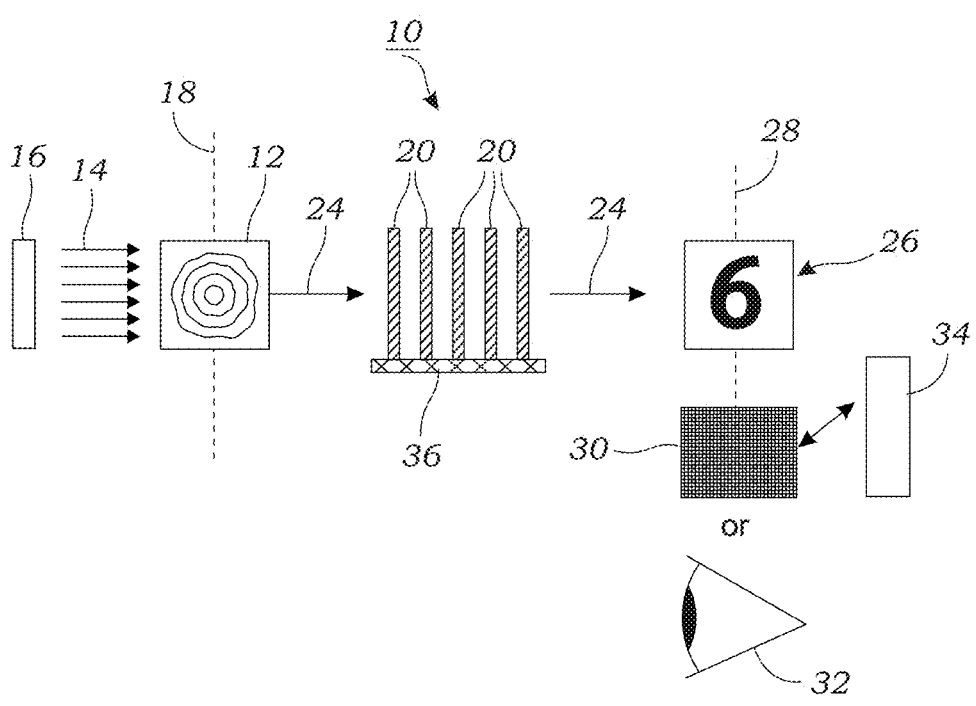
FIG. 1A schematically illustrates an exemplary physical embodiment of a diffractive optical network. In this embodiment, the diffractive optical network operates in transmission mode wherein light passes through the one or more diffractive layers.

FIG. 1A schematically illustrates one embodiment of a diffractive optical network 10 that reconstructs input holograms 12 to reveal accurate optical images, optical signals, or optical data. The input hologram(s) 12 are created with illumination 14 from one or more light sources 16. The one or more light sources 16 may include light from any number of light sources including light bulb, laser, light emitting diodes (LEDs), laser diodes, etc. The input hologram(s) 12 may define optical field(s) that encode optical images, optical signals, or optical data. Optical images may include, for example, one or more objects within the optical image(s). As explained herein, the input hologram(s) are input to the diffractive optical network 10. The diffractive optical network 10 contains one or more diffractive layers 20. As explained herein, in one preferred embodiment, there are a plurality of diffractive layers 20 used in the diffractive optical network 10. However, in other embodiments, only a single diffractive layer 20 may be used. However, there is a tradeoff in the performance of the diffractive optical network 10 based on the number of diffractive layers 20. However, in certain embodiments, only a single diffractive layer 20 may produce acceptable results.

Figure 1B:
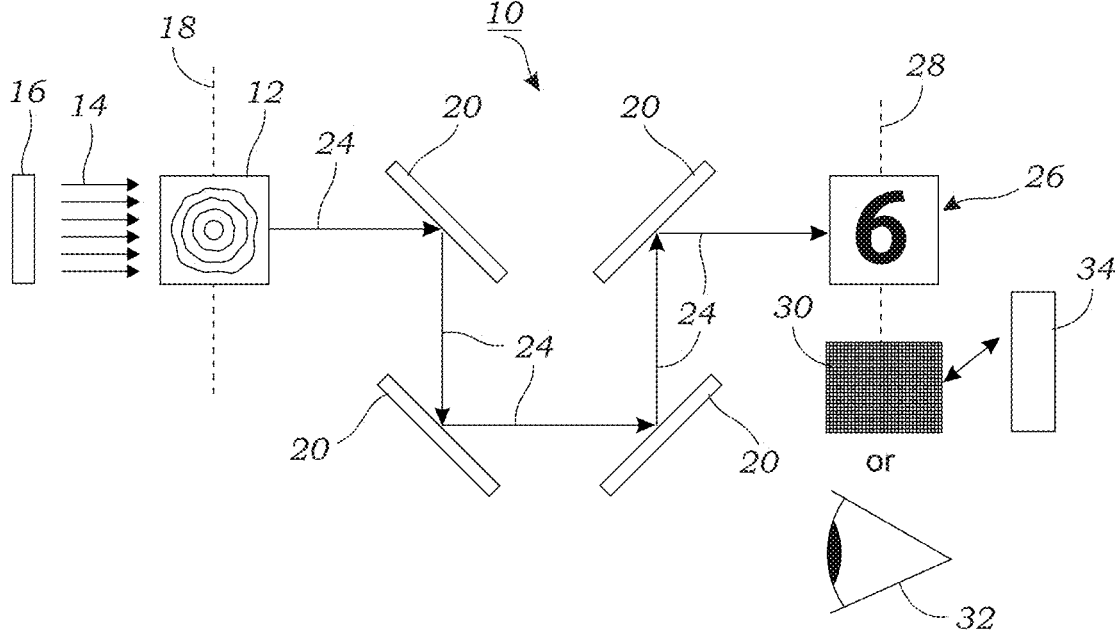
FIG. 1B schematically illustrates an exemplary physical embodiment of a diffractive optical network. In this embodiment, the diffractive optical network operates in reflection mode wherein light reflects off the one or more diffractive layers.

The diffractive optical network 10 contains one or more diffractive layers 20 that are physical layers which may be formed as a physical substrate or matrix of optically transmissive material (for transmission mode as illustrated in FIG. 1A) or optically reflective material (for reflective mode as illustrated in FIG. 1B). In transmission mode, light or radiation from the input hologram(s) 12 at an input plane 18 passes through the diffractive layer(s) 20. Conversely, in reflective mode (FIG. 1B), light or radiation reflects off the diffractive layer(s) 20. Exemplary materials that may be used for the diffractive layers 20 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. Metal coated materials may be used for reflective diffractive layers 20. Light may emit directly from a light source 16 or multiple light sources 16 and proceed directly into the diffractive optical network 10 (e.g., containing an optical image, optical data, or optical signal). Alternatively, light from the light source(s) 16 may pass through and/or reflect off an object, medium, or the like prior entering the diffractive optical network 10. When the light source(s) 16 is/are used as part of the diffractive optical network 10, the light source(s) 16 may be artificial (e.g., light bulb, laser, light emitting diodes, laser diodes, etc.). In other embodiments, the light source(s) 16 may include natural light such as sunlight or other naturally occurring electromagnetic wavelength(s) or a mix of both artificial and natural light.

As explained herein, the diffractive optical network 10 is able to reconstruct the at least one input optical image, input optical signal, or input optical data in the input hologram(s) 12 that is/are substantially free of twin-image noise or artifacts. The input hologram(s) 12 at the input plane 18 to the diffractive optical network 10 may include or encode an optical image that enters the diffractive optical network 10 as is illustrated in FIGS. 1A and 1B. It should also be appreciated that the input hologram(s) 12 may also include optical signals or optical data. The optical signals or optical data that are encoded in the input hologram(s) 12 may be generated at the light source 16 or they may be generated by light that is transmitted and/or reflected off a surface, media, or object(s). The one or more optically transmissive and/or reflective diffractive layers 20 and the plurality of physical features 22 thereon or therein collectively define a trained mapping function between (1) an input hologram 12 containing at least one input optical image, input optical signal, or input optical data to the diffractive optical network 10 and (2) at least one output optical image, output optical signal, or output optical data 26 created from the one or more optically transmissive and/or reflective diffractive layers 20, the trained mapping function reconstructing the at least one input optical image, input optical signal, or input optical data that is/are substantially free of twin-image noise or artifacts and is/are projected onto an observation plane or surface 32 and/or one or more optical detectors 30 configured to see/reveal the at least one output optical image, output optical signal, or output optical data resulting from light passing through and/or reflecting off of the diffractive optical network 10.

With reference to FIGS. 2-5, each diffractive layer 20 of the diffractive optical network 10 has a plurality of physical features 22 formed on the surface of the diffractive layer 20 or within the diffractive layer 20 itself that collectively define a pattern of physical locations along the length and width of each diffractive layer 20 that have varied transmission properties (or varied reflection properties for the embodiment of FIG. 1B). The physical features 22 formed on or in the diffractive layers 20 thus create a pattern of physical locations within the diffractive layers 20 that have different valued transmission properties as a function of lateral coordinates (e.g., length and width and in some embodiments depth) across each diffractive layer 20. In some embodiments, each separate physical feature 22 may define a discrete physical location on the diffractive layer 20 while in other embodiments, multiple physical features 22 may combine or collectively define a physical region with a particular transmission (or reflection) property. The one or more diffractive layers 20 arranged along the optical path 24 (FIGS. 1A and 1B) collectively generate an output optical image, optical signal, or data 26 that reconstructs the image, signal, or data at an output plane 28. As explained herein the one or more optical detectors 30 or an observation plane or surface 32 may be located at the output plane 28 to capture or see the reconstructed output optical image, optical signal, or data 26. The one or more optical detectors 30 or the observation plane or surface 32 are located at a fixed axial distance or a range of axial distances from the one or more diffractive layers 20.

The pattern of physical locations formed by the physical features 22 may define, in some embodiments, an array located across the surface of the diffractive layer 20. With reference to FIG. 2, the diffractive layer 20 in one embodiment is a two-dimensional generally planer diffractive layer 20 having a length (L), width (W), and thickness (t) that all may vary depending on the particular application. In other embodiments, the diffractive layer 20 may be non-planer such as, for example, curved. In addition, while FIG. 2 illustrates a rectangular or square-shaped diffractive layer 20 different geometries are contemplated. With reference to FIGS. 2-5, the physical features 22 and the physical regions formed thereby act as artificial "neurons" that connect to other "neurons" of other diffractive layers 20 of the diffractive optical network 10 through optical diffraction (or reflection in the case of the embodiment of FIG. 1B) and alter the phase and/or amplitude of the light wave. The particular number and density of the physical features 22 or artificial neurons that are formed in each diffractive layer 20 may vary depending on the type of application. In some embodiments, the total number of artificial neurons may only need to be in the hundreds or thousands while in other embodiments, hundreds of thousands or millions of neurons or more may be used. Likewise, the number of diffractive layers 20 that are used in a particular diffractive optical network 10 may vary although it typically ranges from at least one diffractive layer 20 to less than ten diffractive layers 20.

As seen in FIGS. 1A and 1B, the output optical image, signal, or data 26 that is generated at the output plane 28 is, in one embodiment, captured by one or more optical detectors 30. The optical detector(s) 30 may include, for example, an optical image sensor (e.g., CMOS image sensor or image chip such as CCD), photodetectors (e.g., photodiode such as avalanche photodiode detector (APD)), photomultiplier (PMT) device, and the like. The photodetectors may be arranged in an array in some embodiments. In some embodiments, there are multiple optical detectors 30. These may be discrete optical detectors 30 or they may even be certain pixels on a larger detector array such as CMOS image sensor or a focal plane array that act as individual sensors. In some embodiments, there may be a single optical detector 30 that is scanned along the output plane 28 to capture the full output optical image, signal, or data 26 that is generated by the diffractive optical network 10. The one or more optical detectors 30 may, in some embodiments, be coupled to a computing device 34 as seen in FIGS. 1A and 1B (e.g., a computer or the like such as a personal computer, laptop, server, mobile computing device) that is used to acquire, store, process, manipulate, analyze, and/or transfer the output optical image, signal, or data 26. In other embodiments, the optical detector(s) 30 may be integrated within a device such as a diffractive camera that is configured to acquire, store, process, manipulate, analyze, and/or transfer the output optical image, signal, or data 26. In some embodiments, the optical detector(s) 30 may be associated with an aperture. An opaque layer having one or more apertures (not shown) formed therein may be interposed between the last of the diffractive layers 20 and the optical detector(s) 30. In some embodiments, the optical sensor(s) 30 (e.g., optical image sensor or photodetectors) may be omitted and the output optical image, signal, or data 26 that is generated by the diffractive optical network 10 is projected onto a surface or observation plane 32. The one or more diffractive layers 20 function as a projector of the optical image(s), optical data, and/or optical signal(s).

The surface or observation plane 32 that the output optical image, signal, or data 26 is projected on may include, for example, an eye. An observer (e.g., the eye(s) of a person), lens/lens set, or screen may be located at the surface or observation plane 32 so that the reconstructed optical image, signal, or data 26 can be observed or viewed. In some embodiments, the reconstructed output optical image, signal, or data 26 is an object classification decision which is projected onto one or more optical detectors 30 or onto an output observation plane 32. For example, the location of the one or more optical detectors 30 that receive light or light of a certain amplitude may correspond to a particular object classification. This may also include particular pixel(s) located on an image sensor that is used as the optical detector 30.

FIG. 1B schematically illustrates one embodiment of a diffractive optical network 10 that is used in reflection mode. Similar components and features shared with the embodiment of FIG. 1A are labeled similarly. In this embodiment, illumination 14 creates the input hologram(s) 12 for the diffractive optical network that encodes an image of the numeral "6". Of course, while the input hologram 12 that enters the diffractive optical network 10 is described in the context of FIG. 1B as containing an optical image (i.e., image of object) it should be appreciated that the input hologram 12 may also include optical signals or optical.

This input hologram(s) 12 is/are input to the diffractive optical network 10. In this embodiment, the diffractive optical network 10 operates in reflection mode whereby light is reflected by a plurality of diffractive layers 20 (which could also be a single layer 20 in some embodiments). As seen in the embodiment of FIG. 1B, the optical path 24 is a folded optical path as a result of the reflections off the plurality of diffractive layers 20. The number of diffractive layers 20 may vary depending on the particular function or task that is to be performed as noted above. Each diffractive layer 20 of the diffractive optical network 10 has a plurality of physical features 22 formed on the surface of the diffractive layer 20 or within the diffractive layer 20 itself that collectively define a pattern of physical locations along the length and width of each diffractive layer 20 that have varied reflection properties. Like the FIG. 1A embodiment, the output optical image, signal, or data 26 at the output plane 28 is captured by one or more optical detectors 30 or is projected onto a surface or observation plane 32. The one or more optical detectors 30 may be coupled to a computing device 34 as herein. As an alternative to the one or more optical detectors 30, the output optical image, signal, or data 26 may be projected onto a surface or observation plane 32.

While FIG. 1B illustrates an embodiment of a diffractive optical network 10 that functions in reflection mode, it should be appreciated that in other embodiments the diffractive optical network 10 is a hybrid that includes aspects of a transmission mode of FIG. 1A and the reflection mode of FIG. 1B. In this hybrid embodiment, the light from the input holograms 12 transmits through one or more diffractive layers 20 and also reflects off one or more diffractive layers 20.

FIG. 3 illustrates one embodiment of how different physical features 22 are formed in the diffractive layer 20. In this embodiment, a diffractive layer 20 has different thicknesses (t) of material at different lateral locations along the diffractive layer 20. In one embodiment, the different thicknesses (t) modulate the phase of the light passing through the diffractive layer 20. This type of physical feature 22 may be used, for instance, in the transmission mode embodiment of FIG. 1A. The different thicknesses of material in the diffractive layer 20 forms a plurality of discrete "peaks" and "valleys" that control the transmission properties of the neurons formed in the diffractive layer 20. The different thicknesses of the diffractive layer 20 may be formed using additive manufacturing techniques (e.g., 3D printing) or lithographic methods utilized in semiconductor processing. For example, the design of the diffractive layer(s) 20 may be stored in a stereolithographic file format (e.g., .stl file format) which is then used to 3D print the diffractive layer(s) 20. Other manufacturing techniques include well-known wet and dry etching processes that can form very small lithographic features on a diffractive layer 20. Lithographic methods may be used to form very small and dense physical features 22 on the diffractive layer 20 which may be used with shorter wavelengths of the light. As seen in FIG. 3, in this embodiment, the physical features 22 are fixed in permanent state (i.e., the surface profile is established and remains the same once the diffractive layer 20 is formed).

FIG. 4 illustrates another embodiment in which the physical features 22 are created or formed within the diffractive layer 18. In this embodiment, the diffractive layer 20 may have a substantially uniform thickness but have different regions of the diffractive layer 20 have different optical properties. For example, the refractive (or reflective) index of the diffractive layer(s) 20 may be altered by doping the diffractive layer(s) 20 with a dopant (e.g., ions or the like)

to form the regions of neurons in the diffractive layer(s) 20 with controlled transmission properties (or absorption and/or spectral features). In still other embodiments, optical nonlinearity can be incorporated into the deep optical network design using various optical non-linear materials (e.g., crystals, polymers, semiconductor materials, doped glasses, polymers, organic materials, semiconductors, graphene, quantum dots, carbon nanotubes, and the like) that are incorporated into the diffractive layer 20. A masking layer or coating that partially transmits or partially blocks light in different lateral locations on the diffractive layer 20 may also be used to form the neurons on the diffractive layer(s) 20.

Alternatively, the transmission function of the physical features 22 or neurons can also be engineered by using metamaterial or plasmonic structures. Combinations of all these techniques may also be used. In other embodiments, non-passive components may be incorporated in into the diffractive layer(s) 20 such as spatial light modulators (SLMs). SLMs are devices that impose spatial varying modulation of the phase, amplitude, or polarization of light. SLMs may include optically addressed SLMs and electrically addressed SLM. Electric SLMs include liquid crystal-based technologies that are switched by using thin-film transistors (for transmission applications) or silicon back-planes (for reflective applications). Another example of an electric SLM includes magneto-optic devices that use pixelated crystals of aluminum garnet switched by an array of magnetic coils using the magneto-optical effect. Additional electronic SLMs include devices that use nanofabricated deformable or moveable mirrors that are electrostatically controlled to selectively deflect light.

FIG. 5 schematically illustrates a cross-sectional view of a single diffractive layer 20 of a diffractive optical network 10 according to another embodiment. In this embodiment, the diffractive layer 20 is reconfigurable in that the optical properties of the various physical features 22 that form the artificial neurons may be changed, for example, by application of a stimulus (e.g., electrical current or field). An example includes spatial light modulators (SLMs) discussed above which can change their optical properties. In other embodiments, the layers may use the DC electro-optic effect to introduce optical nonlinearity into the diffractive layer(s) 20 of a diffractive optical network 10 and require a DC electric-field for each diffractive layer 20 of the diffractive optical network 10. This electric-field (or electric current) can be externally applied to each diffractive layer 20 of the diffractive optical network 10. Alternatively, one can also use poled materials with very strong built-in electric fields as part of the material (e.g., poled crystals or glasses). In this embodiment, the neuronal structure is not fixed and can be dynamically changed or tuned as appropriate (i.e., changed on demand). This embodiment, for example, can provide a learning diffractive optical network 10 or a changeable diffractive optical network 10 that can be altered on-the-fly to adjust to different types of tasks or alter the network based on the nature of the object, data, or signal being input to the diffractive optical network. This also allows the diffractive optical network 10 to adjust or fix itself in response to, for example, misalignments of the diffractive layer(s) 20.

The particular spacing of the diffractive layers 20 that make the diffractive optical network 10 may be maintained using a holder 36 like that illustrated in FIG. TA. The holder 36 may contact one or more peripheral surfaces of the diffractive layer(s) 20. In some embodiments, the holder 36 may contain a number of slots that provide the ability of the user to adjust the spacing between adjacent diffractive layers 20. A single holder 36 can thus be used to hold different diffractive optical networks 10. In some embodiments, the diffractive layers 20 may be permanently secured to the holder 36 while in other embodiments, the diffractive layers 20 may be removable and/or replaceable from the holder 36 and replaceable. For example, on or more diffractive layers 20 may be removed/added to the holder 36 to create different diffractive optical networks 10 or to tune/alter the performance of the diffractive optical network 10.

The diffractive optical network 10 described herein is used to reconstruct an accurate or faithful optical image, optical signal, or optical data that is encoded as an input hologram 12. The reconstruction process generates an output optical image, optical signal, or optical data 26 that is/are substantially free of twin-image noise or artifacts. Importantly, this removal of twin-image noise or artifacts occurs all-optically and without the need for any computational resources.

Figure 6:
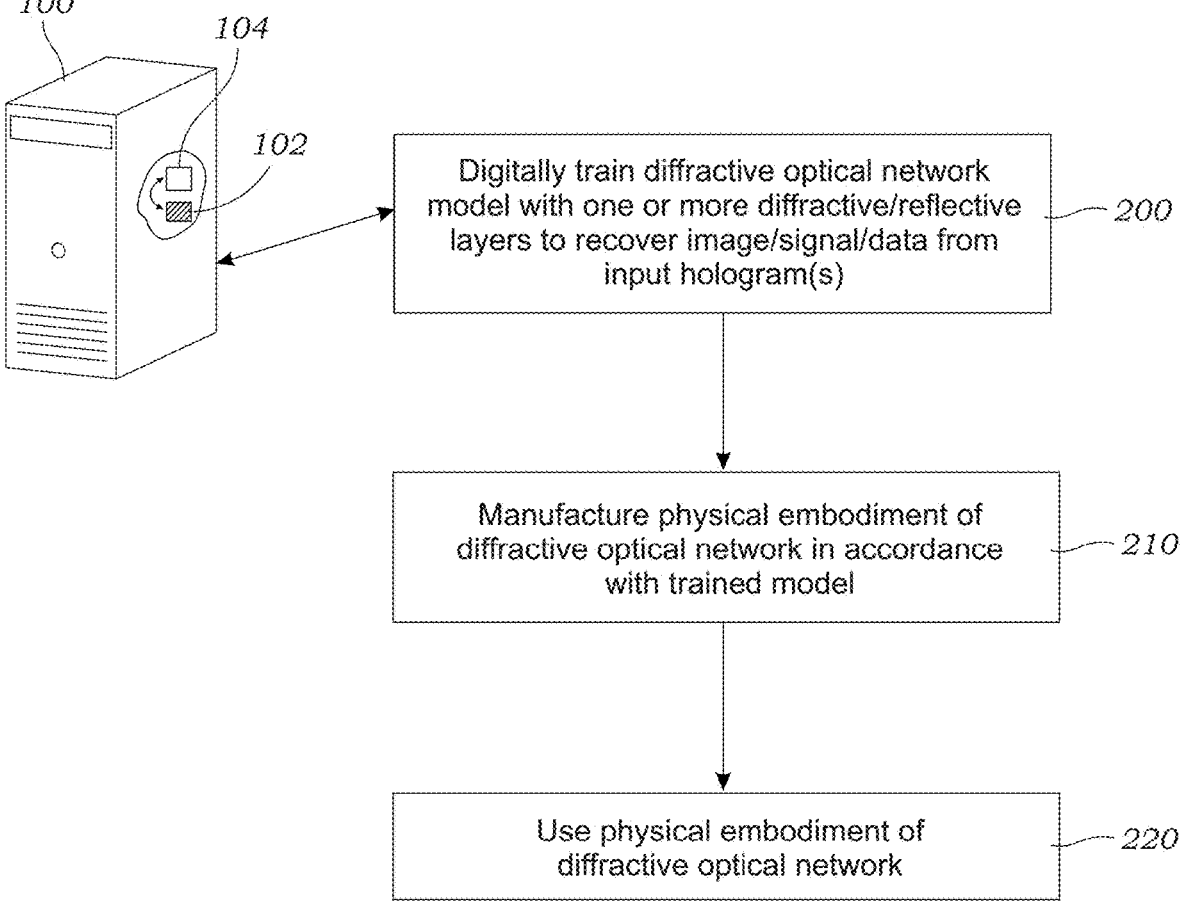
FIG. 6 illustrates a method of digitally training a model of diffractive/reflective layers to reconstruct optical image(s), data, and/or signals that are substantially free of twin-image artifacts or other noise from input hologram(s) that encode the optical image, data, and/or signals. Once the training is complete, the physical embodiment of the diffractive optical network is then manufactured or fabricated for use.

As explained herein, the design or physical embodiment of the diffractive optical network 10 is able to reconstruct an accurate or faithful image, optical signal, or optical data 26 from an input hologram 12. FIG. 6 illustrates a flowchart of the operations or processes according to one embodiment to create and use a diffractive optical network 10 that can reconstruct input holograms 12 to generate reconstructed optical images, signals, or data 26 that are substantially free of twin-image artifacts or other noise. As seen in operation 200, at least one computing device 100 having one or more processors 102 executes software 104 thereon to then digitally train a model or mathematical representation of diffractive or reflective diffractive layer(s) (i.e., a diffractive optical network model) to, for example, reconstruct the image (or signal/data) of one or more objects from a hologram 12. In this digital training operation 200, a set of diffractive surfaces/layer(s) are trained using deep learning to all-optically reconstruct the image (or optical signal/data) of one or more objects that is contained in an input hologram 12, i.e., the image reconstruction is processed at the speed of light propagation through the diffractive layer(s). Once the design or model has been established and optimized that creates the physical layout for the different physical features 22 that form the artificial neurons in each of the plurality of physical diffractive layers 20 which are present in the diffractive optical network 10, the physical embodiment of the diffractive optical network 10 is then manufactured or fabricated that reflects the computer-derived design. This is illustrated in operation 210 of FIG. 6. The design, in some embodiments, may be embodied in a software format (e.g., SolidWorks, AutoCAD, Inventor, or other computer-aided design (CAD) program or lithographic software program) may then be manufactured into a physical embodiment that includes the plurality of diffractive layers 20. The one or more diffractive layers 20, once manufactured may be mounted or disposed in a holder 36 such as illustrated in FIG. 1A. Once the physical embodiment of the diffractive optical network 10 has been made, the diffractive optical network 10 is then used to perform the specific task or function such as recovering the image/signal/data of the object(s) that is contained in the input hologram 12. Use of the physical embodiment is seen in operation 220 in FIG. 6.

The diffractive optical network 10 may be incorporated into a portable electronic device such as a camera, mobile phone, or other wearable device (e.g., glasses or goggles). For example, the one or more diffractive layers 20 along with the detector(s) 30 or observation surface or plane 32 may be located within the portable electronic device. The portable electronic device may thus be able to use the diffractive optical network 10 contained therein to project or capture reconstructed optical image(s), optical data, or optical signal(s) 26.

Results

Figure 7A:
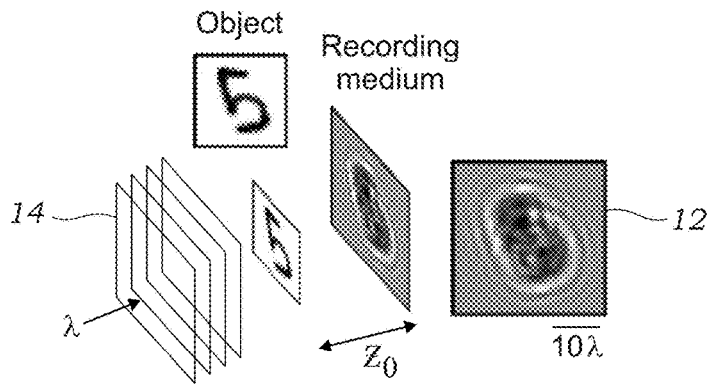
FIGS. 7A-7B schematically illustrate hologram recording and reconstruction method/scheme for the all-optical holographic reconstruction method.
Figure 7B:
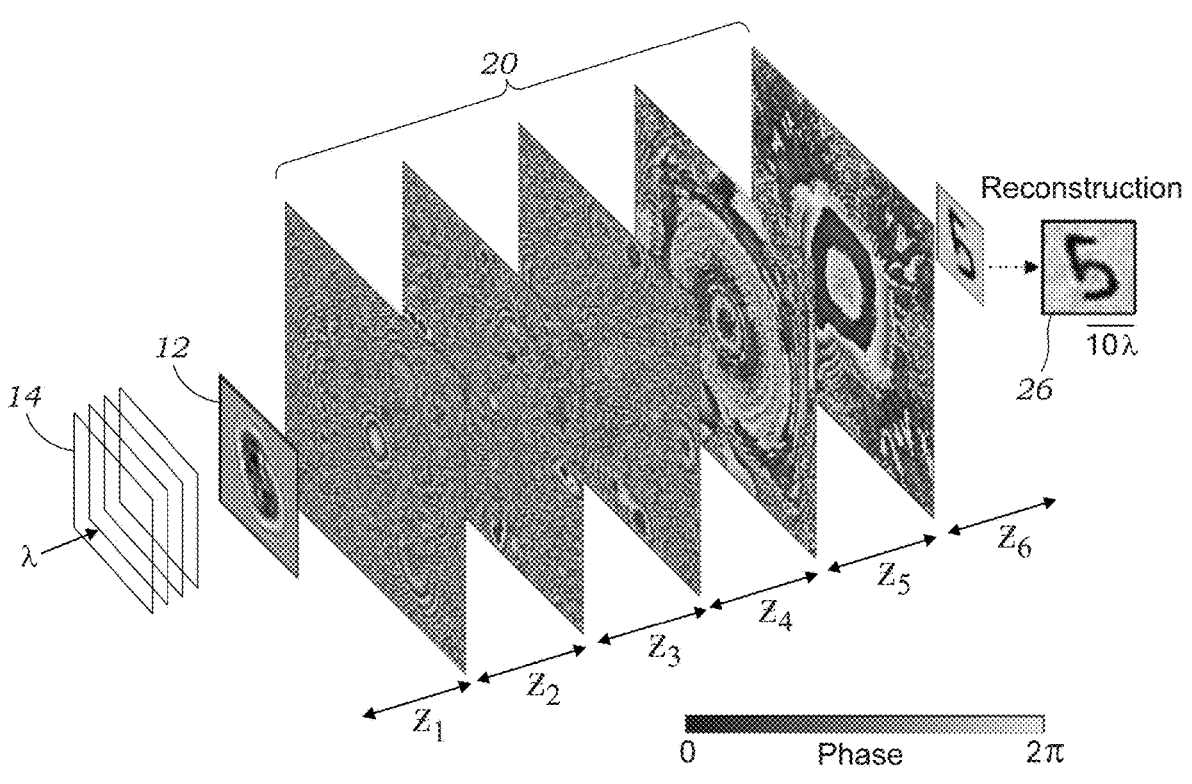

A schematic of the all-optical hologram reconstruction system is shown in FIGS. 7A and 7B. The hologram recording process is the same as for in-line holography, i.e., an unknown object is illuminated with illumination 14 that is a coherent plane wave of wavelength $\lambda$, and the recording medium, e.g., an opto-electronic image sensor-array or a photographic emulsion, is placed at a distance $z_0$ from the object plane; in this work, $z_0=30\lambda$ was used. The component of the wave scattered by the object interferes with the unscattered, directly transmitted wave, producing an in-line hologram. During the all-optical reconstruction through the diffractive optical network 10 (FIG. 7B), the hologram recording medium or its digital copy is assumed to be illuminated with a plane wave of the same wavelength. In this embodiment, a set of spatially-engineered, transmissive diffractive layers 20 is placed between the input hologram 12 and the output (i.e., the reconstruction or observation) plane 28, which all-optically computes a twin-image-free reconstruction image 26 of the original object at the network output (see FIG. 7B). The axial distances between successive transverse planes i.e., the input hologram plane 18, diffractive network layers 20 and the output/reconstruction plane 28, are denoted by $z_i$, i=1, . . . , N+1, where N is the number of diffractive layers 20 in the diffractive optical network 10; which here, N=5 and $z_i=37.5\lambda$ was used herein. The size of the unknown object to be reconstructed is assumed to be $25\lambda$, the lateral extent of the recorded hologram is $42\lambda$, and the width of each diffractive layer 20 is assumed to be $100\lambda$.

Figure 12:
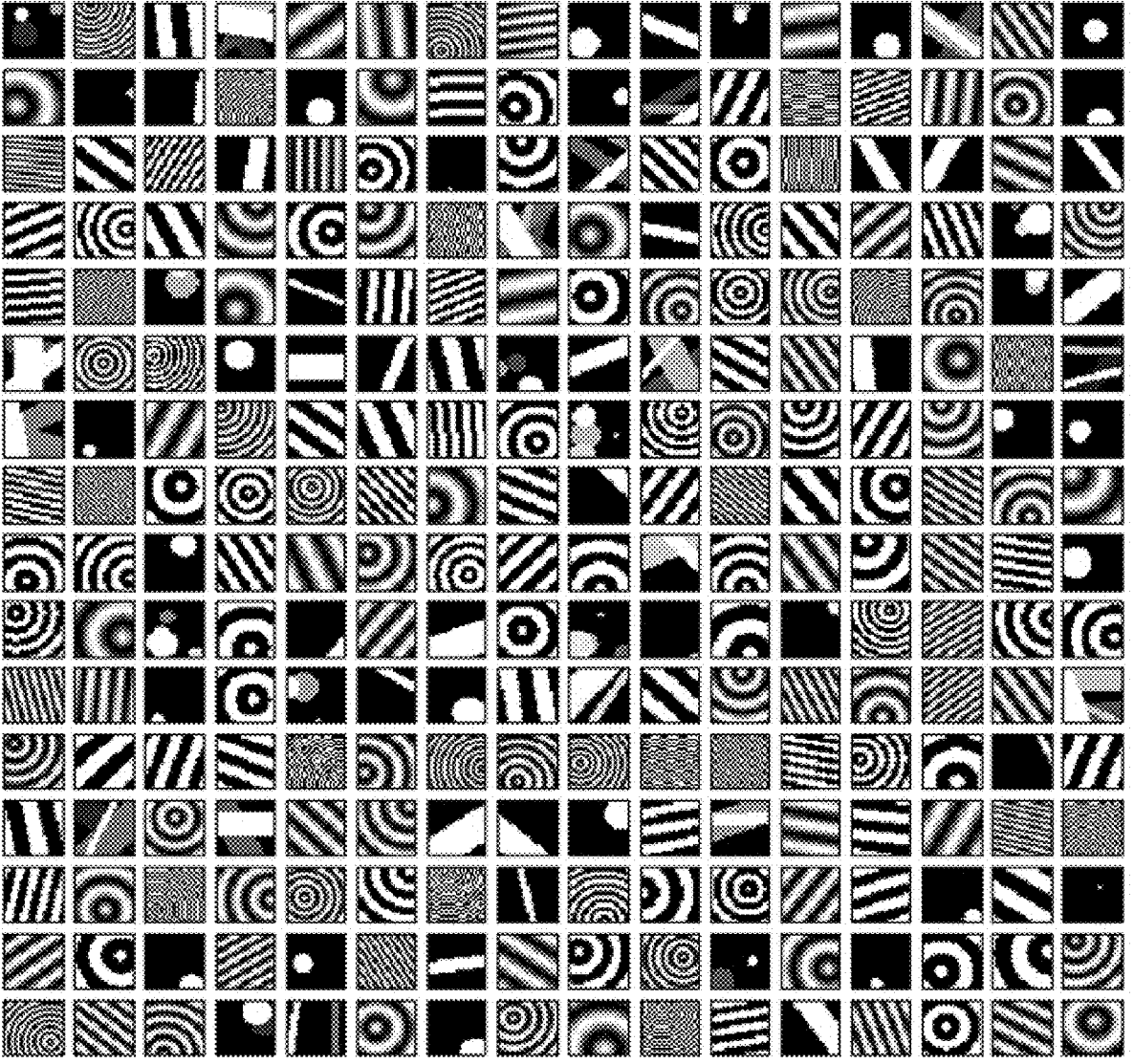
FIG. 12 illustrates examples of training images. Some examples of the images used to augment the MNIST dataset for the purpose of training the diffractive networks for all-optical holographic reconstruction. 55,000 such images were used together with 55,000 images in the MNIST training set, i.e., the total size of the augmented training image set was 110,000. The remaining 5,000 images in the MNIST training set were set aside for validation. None of the images used in blind testing for evaluating the reported models were in the augmented training set or the validation set.

Based on these hyper-parameters, an all-optical diffractive optical network 10 with N=5 diffractive layers 20 was trained, where each diffractive layer 20 had a total of 200×200 trainable parameters. Each one of these parameters corresponds to the phase value of a diffractive feature (neuron) over an area of $\lambda/2\times\lambda/2$. Therefore, using deep learning a total of 0.2 million independent phase values were optimized, spread across N=5 transmissive diffractive layers 20 forming the diffractive optical network 10 (FIG. 7B). For the training image data, the MNIST handwritten digit dataset was used, which was augmented with an additional custom-built image dataset of generic shapes, e.g., patches, circles, straight-line and circular-line gratings etc. (see FIG. 12 for examples of these additional training images). The total number of images in the training dataset was 110,000 (55,000 from the MNIST training set, 55,000 from the custom prepared image dataset); none of these images in the training dataset were used in the blind testing of the final diffractive optical network models. Other details of the network model training process, including the loss function, optimization algorithm and training times, are reported herein.

Figure 8:
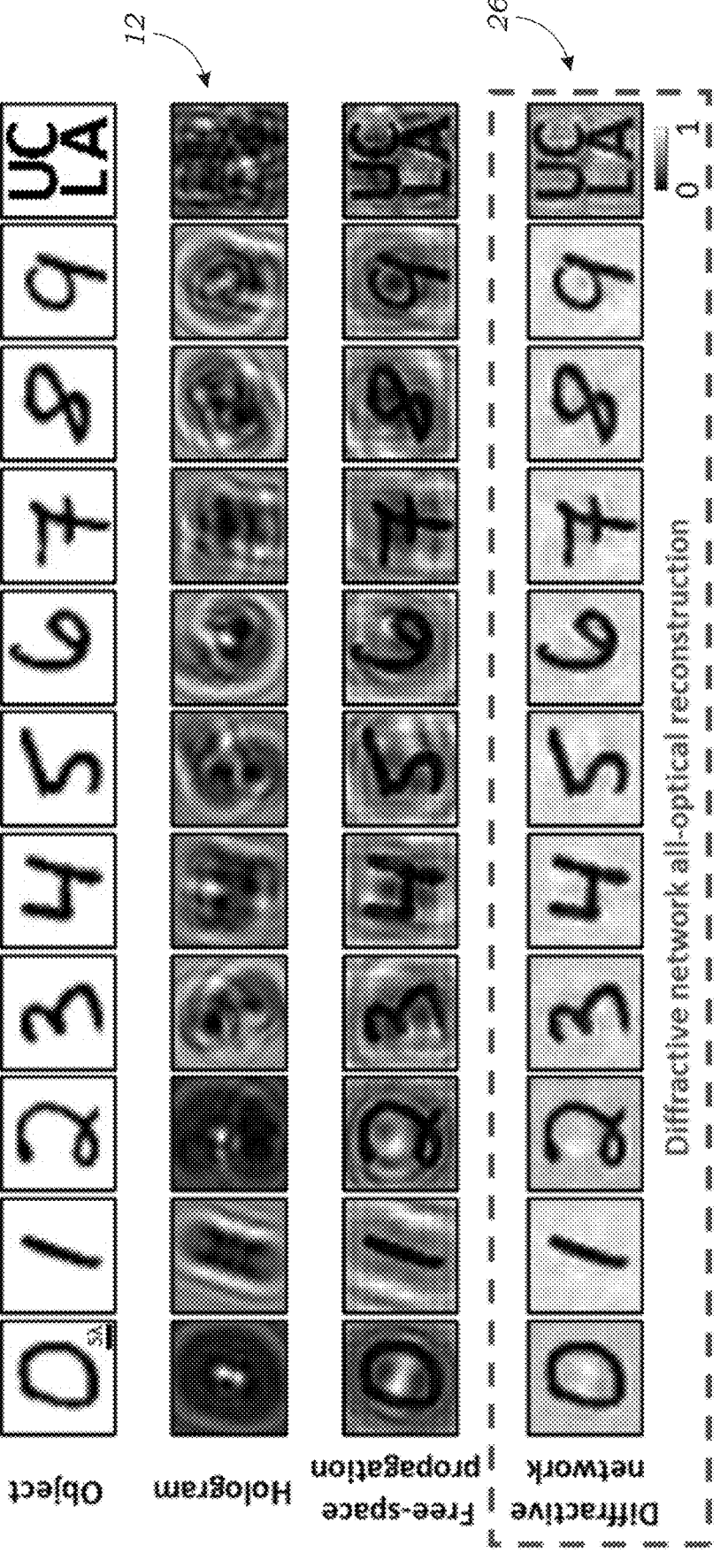
FIG. 8 illustrates the performance of all-optical hologram reconstruction using diffractive networks. The first two rows depict the target object amplitudes, and the corresponding recorded in-line holograms, respectively. The axial distance between the object and the recording plane is assumed to be 30λ. The reconstructed object intensities by free-space propagation are shown in the third row, whereas those by the designed diffractive network are shown in the fourth row.

Once the model of the diffractive optical network 10 was trained for all-optical reconstruction of input holograms 12, it was blindly tested using in-line holograms of new, unknown objects. FIG. 8 reports numerical examples of input holograms 12 and the corresponding all-optical reconstructions obtained at the output of the diffractive optical network 10, which reveal that twin-image related artifacts that normally appear in free-space propagation of the input hologram 12 are eliminated at the observation/output plane 28 of the diffractive optical network 10, as desired. Also note that the images of the letters in the English alphabet were not part of the training image dataset, and therefore the success in the all-optical reconstruction of "UCLA" text from its hologram 12 (see FIG. 8) indicates that the trained diffractive optical network 10 is capable of generalizing to distributions different from the distribution of the objects used during the training phase.

Figure 9:
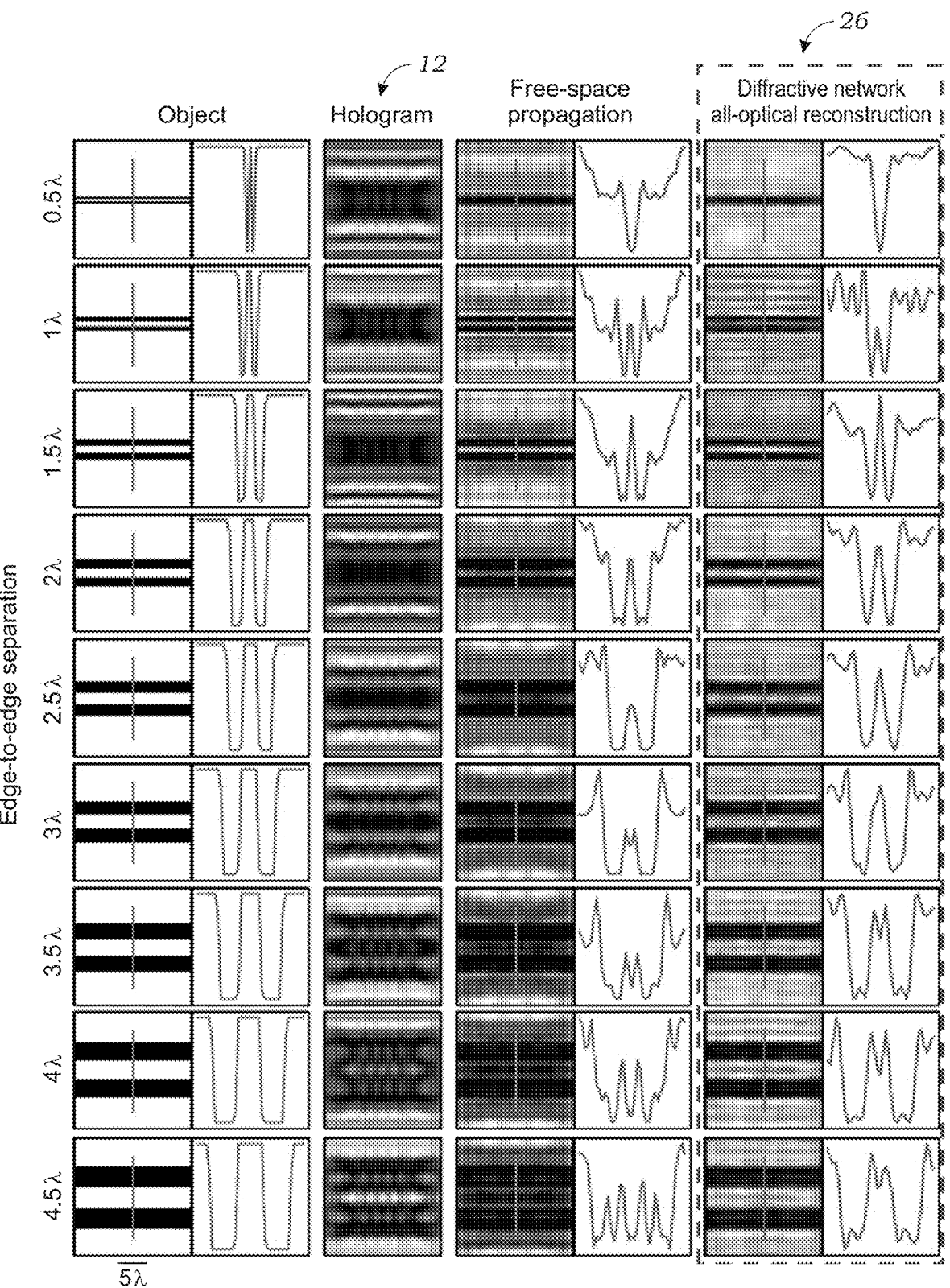
FIG. 9 illustrates the quantification of all-optical holographic image reconstruction resolution. The edge-to-edge separation refers to the separation from the inner edge of one line to the inner edge of the other. Intensity variations along the vertical lines are shown on the accompanying curves (right column).

Next, numerical simulations were used to explore the capability of the same diffractive optical network 10 to all-optically reconstruct and resolve closely spaced objects, composed of two parallel lines with gradually increasing separation; see FIG. 9. For line separations that are equal to or larger than λ, the model of the diffractive optical network 10 succeeded in reconstructing the in-line holograms 12 of these test objects and faithfully resolved the two lines from each other as shown in FIG. 9. Also notice that for line separations that are larger than 3.5λ, the free-space propagation of the input holograms 12 presents stronger spurious/artificial drops around the center of the lines due to the strong twin-image artifacts; this causes the appearance of artificial lines that are comparable to the signal strength of the true object lines. Such spatial artifacts due to twin-images have been successfully suppressed at the output plane 29 of the model of the diffractive optical network 10 as shown in FIG. 9.

Figure 10A:
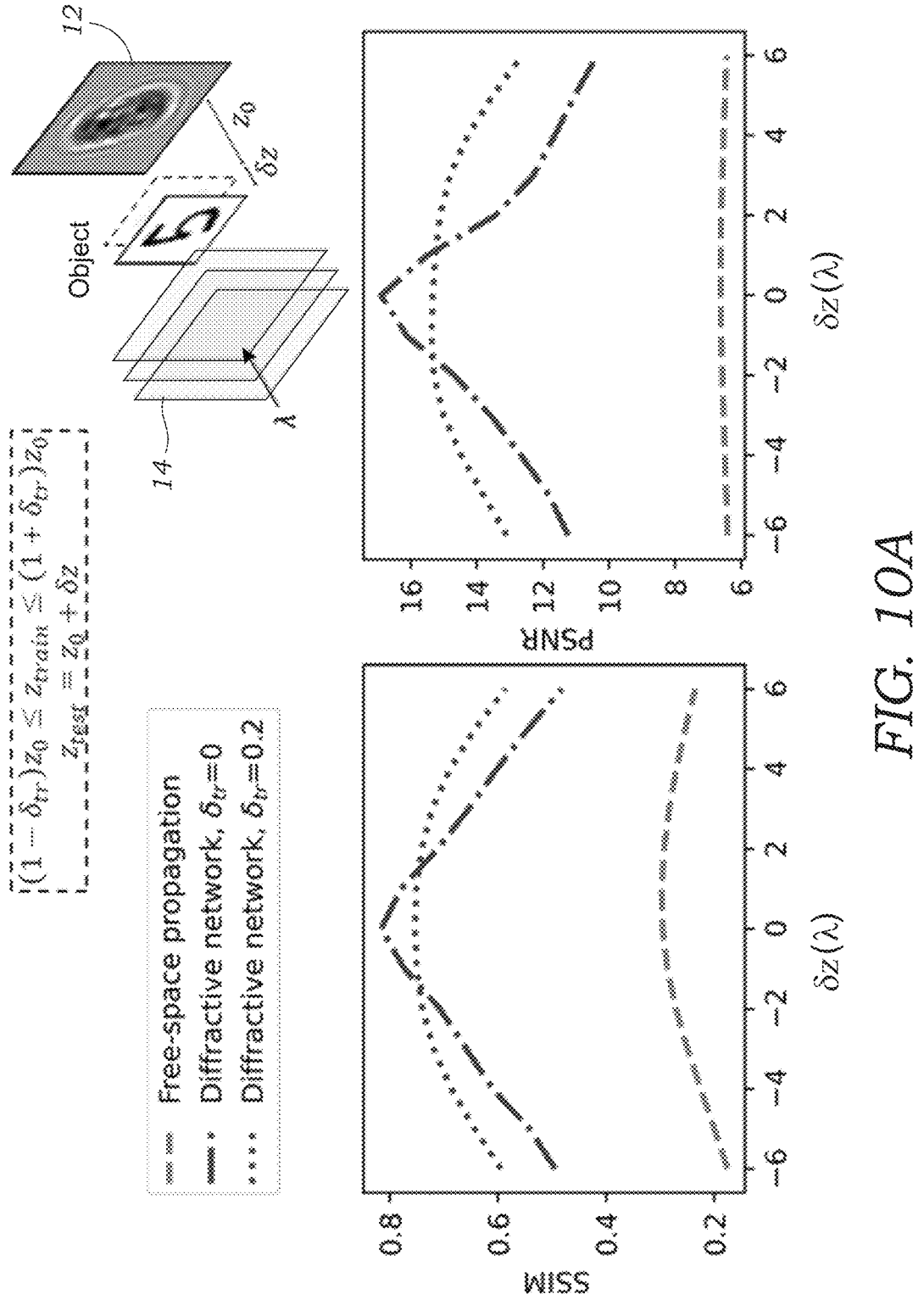
FIGS. 10A-10B illustrate the robustness of all-optical diffractive network reconstructions against the hologram recording distance variations.
Figure 10B:
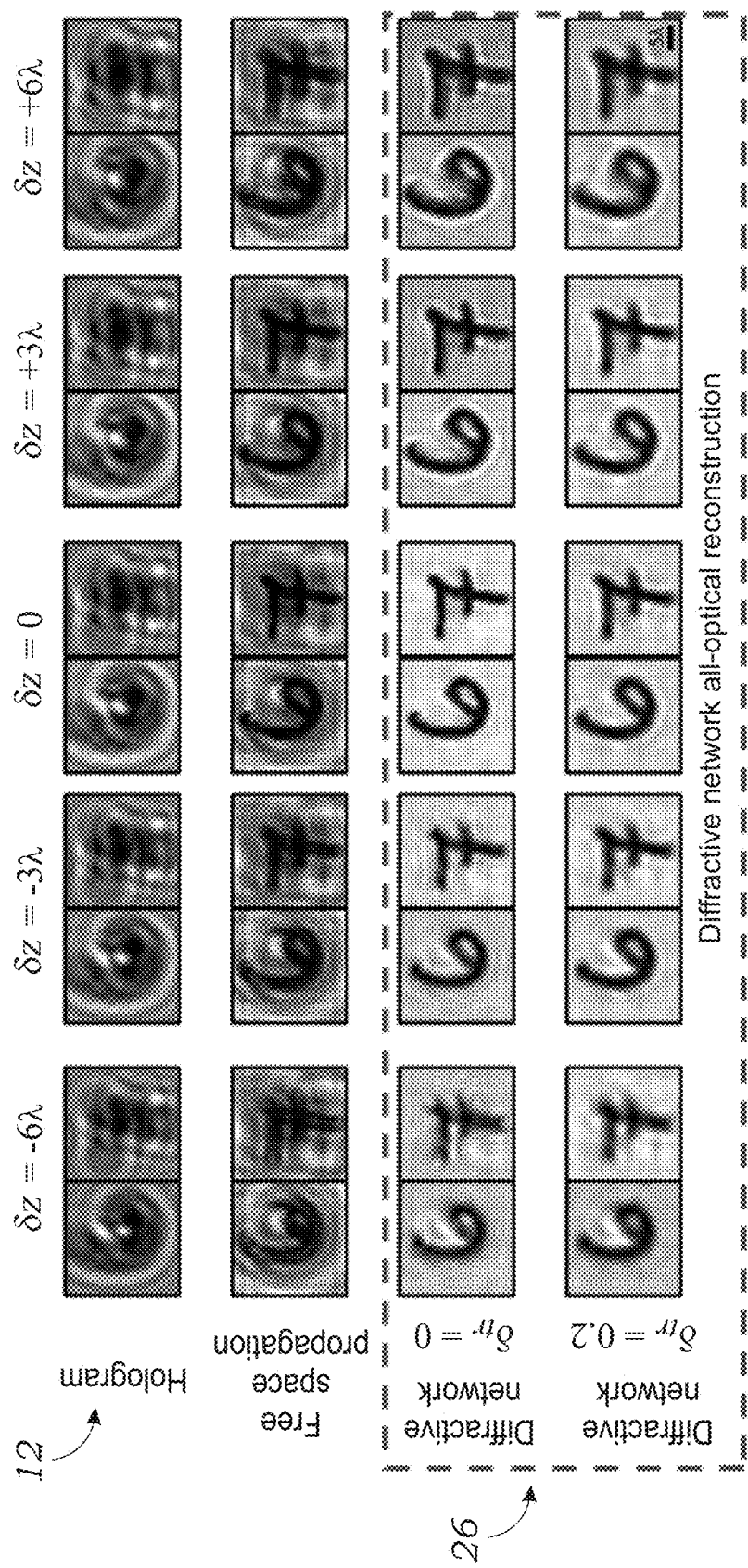

In addition to all-optical reconstruction of in-line holograms 12 and the removal of twin-image artifacts, the presented diffractive network-based holographic image reconstruction framework can provide further advantages such as being more robust to uncontrolled changes in $z_0$, covering an extended depth-of-field in the hologram recording distance. To demonstrate this, the performance of all-optical reconstructions was numerically explored by the same diffractive network design shown in FIG. 7B when the hologram recording distance $z_0=30\lambda$ was changed from its nominal value, covering an axial range of $z_0=24\lambda:36\lambda$; see FIGS. 10A, 10B. In this case, however, the diffractive optical network 10 did not know the exact hologram 12 recording distance that was used and therefore its design did not change compared to earlier results so that one could truly test the robustness of its all-optical reconstructions against changes in the hologram recording distance. To quantify the all-optical image reconstruction performance under this change, 10,000 test images were used of the MNIST dataset to calculate the structural similarity index measure (SSIM) and the peak signal-to-noise ratio (PSNR) values for the reconstructed images 26 at the diffractive network's output 28 as shown in FIG. 10A. FIG. 10B also presents numerical simulations for visual comparison of the resulting all-optical reconstructions for different hologram recording distances, revealing the robustness of the diffractive network's reconstructions even though the hologram recording distance was significantly changed (±20%) from its nominal value which was used during the training of the model of the diffractive optical network 10.

In fact, the all-optical hologram reconstruction performance of the diffractive optical network 10 design can be further improved by incorporating the extended depth-of-field in hologram recording distance during its training process so that the hologram reconstruction at the output plane 28 becomes even less sensitive to the exact value of the recording distance. To demonstrate this capability, another diffractive optical network 10 was trained from scratch, where the hologram recording distance during the training process was treated as a random variable, $z_{train} \sim \text{Uniform}((1-\delta_{tr})z_0, (1+\delta_{tr})z_0)$, where $\delta_{tr}=0.2$ was used (see the Methods section for details). FIG. 10A reveals that the resulting new diffractive optical network design based on this training strategy achieves all-optical reconstruction of input holograms 12 with relatively flat SSIM and PSNR curves, demonstrating its inference success over a large range of hologram recording distances. FIG. 10B also supports the same conclusion by reporting the reconstructed holographic images 26 at the output plane 28 of the diffractive network for $\delta_{tr}=0.2$.

Figure 11A:
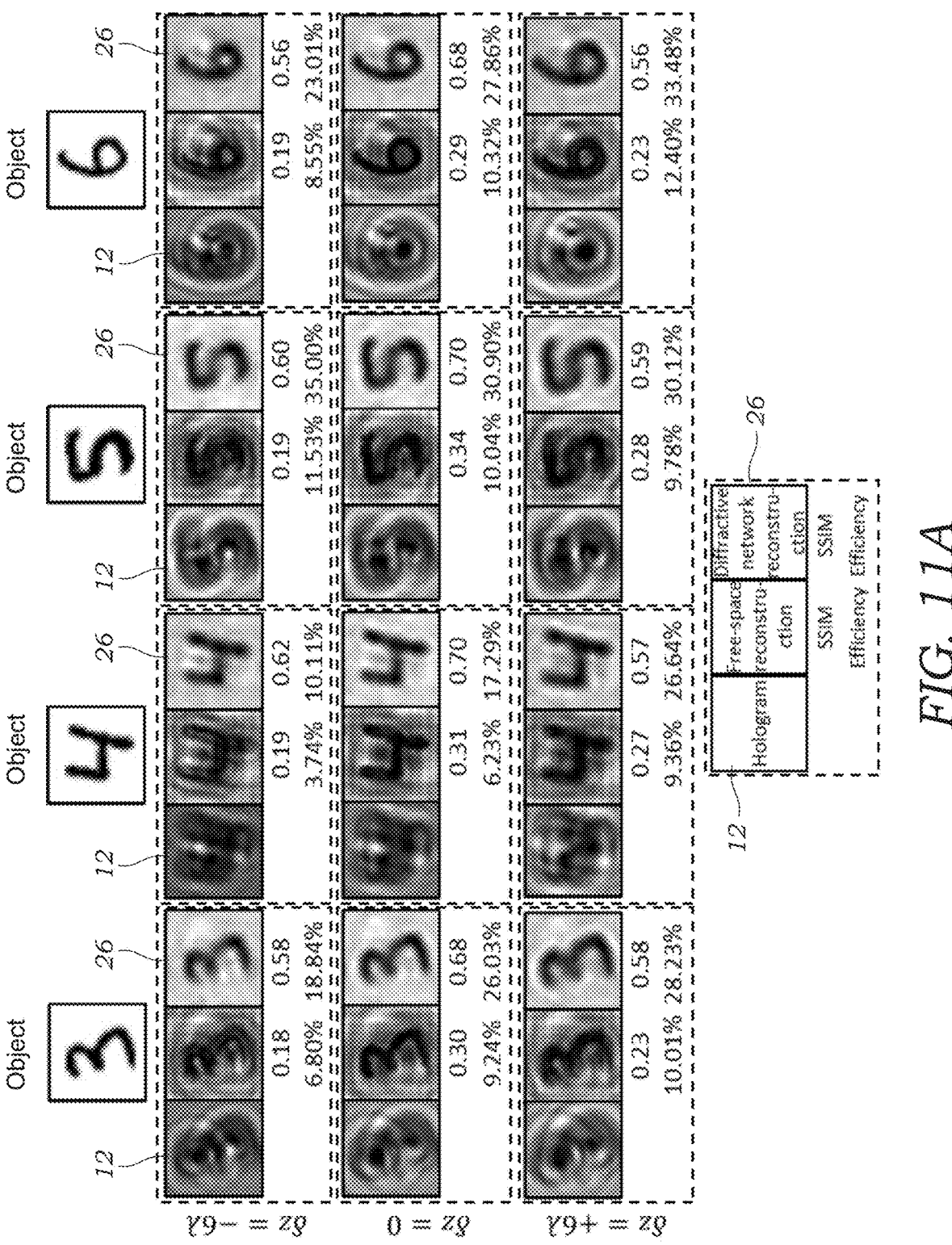
FIGS. 11A-11B illustrate the diffraction efficiency improvement of all-optical holographic reconstructions performed by diffractive networks.
Figure 11B:
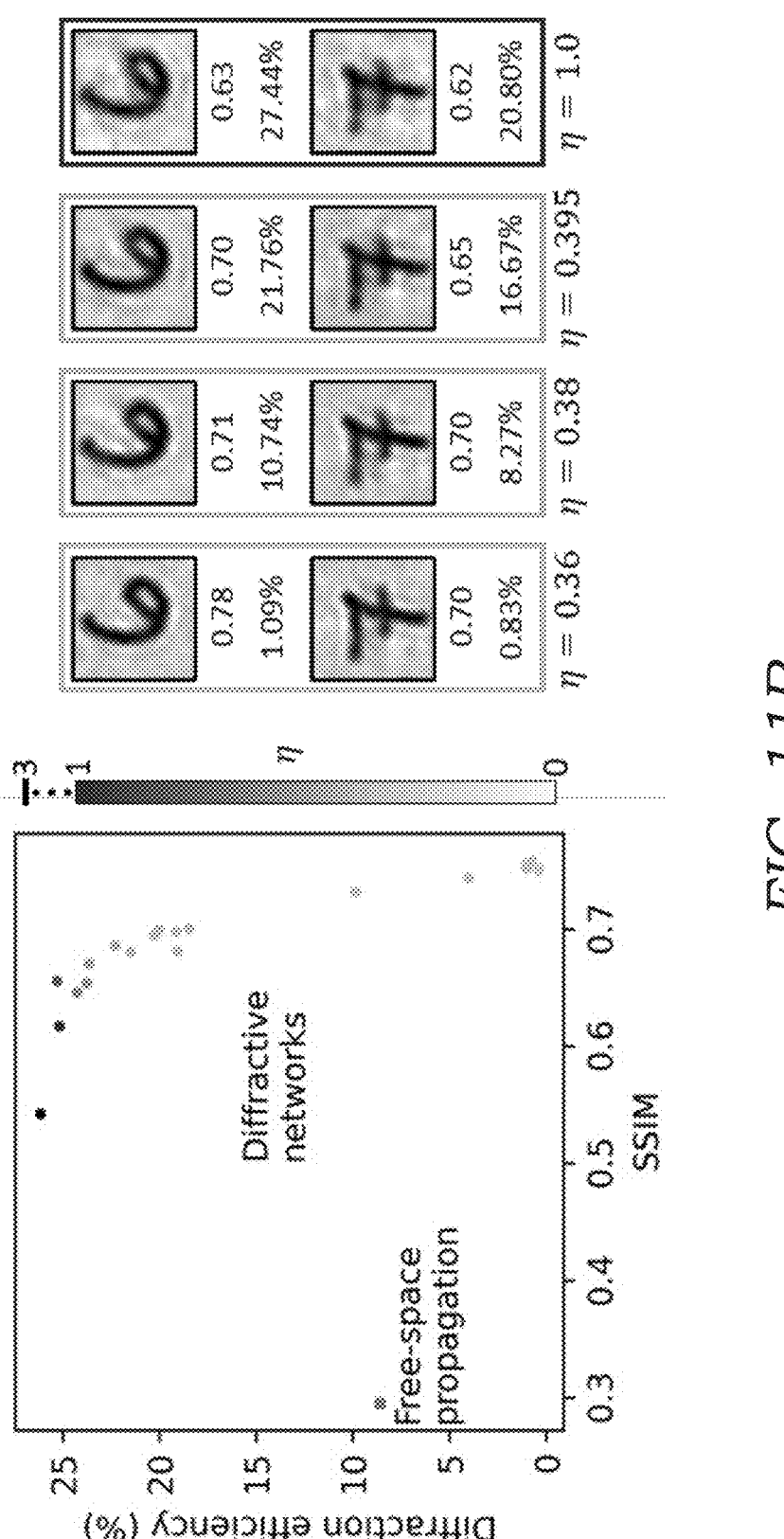

A practical consideration for the use of this presented all-optical hologram reconstruction approach would be the diffraction efficiency of the optical design. The average diffraction efficiencies of the diffractive optical networks 10 trained with $\delta_{tr}=0$ and $\delta_{tr}=0.2$ are found to be ~0.31% and ~0.58% respectively, whereas the average diffraction efficiency for free-space propagation-based reconstruction is ~8.61%. Here, the diffraction efficiency is defined as the ratio of the power at the output reconstruction field-of-view to the input power illuminating the hologram area; the above reported average diffraction efficiency values were calculated over 10,000 test images of the MNIST dataset. In FIGS. 11A, 11B, the diffraction efficiency of the hologram reconstruction diffractive optical network 10 can be significantly improved by adding an efficiency-related penalty term in the training loss function. By properly adjusting the relative weight (η) of this additional loss term to 0.5, a diffractive network with an output diffraction efficiency of ~23.64% was designed; its all-optical reconstruction performance is reported in FIG. 11A. Furthermore, FIG. 11B shows the diffraction efficiency-SSIM trade-off that can be achieved by changing η. For example, by further increasing η to 3.0, a hologram reconstruction diffractive optical network 10 with an average diffraction efficiency of ~26.2% can be designed with a minor sacrifice in the image reconstruction quality.

Discussion

Unlike traditional phase recovery and twin-image elimination methods that are based on algorithms implemented in digital computers, a passive all-optical "processor" is disclosed that includes physical embodiment of a diffractive optical network 10, composed of deep learning-designed diffractive layers 20, that can collectively reconstruct a hologram 12 at its output plane 28 without any digital computation or an external power source except for the illumination light 14. In addition to its passive nature, the hologram reconstruction process occurs almost instantaneously, i.e., at the speed of light propagation through a compact diffractive optical network 10 that extends only ~225λ in the axial direction (from the input plane 18 to the output plane 28).

Despite its major advantages, there are also some limitations of the presented framework. If the hologram recording distance changes drastically compared to the training $z_0$ value, one might need to fabricate a new set of diffractive layers 20 trained by using the new hologram recording distance. However, the results in FIGS. 10A, 10B confirmed that the all-optical reconstruction quality of a diffractive optical network 10 remains very good over a relatively broad range of hologram recording distances, even though the model of the diffractive optical network 10 was trained with a fixed $z_0$ value; in fact, this depth range can be further improved by increasing $\delta_{tr}$ in the training process. Another limitation of the presented method is the required 3D alignment and fabrication precision of the diffractive layers 20. Previous work on diffractive networks for all-optical image classification related tasks revealed that one can vaccinate the diffractive network design and make it more robust in its statistical inference accuracy by incorporating potential misalignments, fabrication imperfections and input object distortions as part of the optical forward model as random variables, similar to the strategy that was used earlier for extending the range of hologram recording distances. Furthermore, the performance of diffractive network-based hologram reconstructions with respect to other practical parameters such as e.g., output diffraction efficiency can be fine-tuned and optimized by adjusting the training loss function as illustrated in FIGS. 11A, 11B, presenting a powerful design flexibility.

A passive all-optical processor is disclosed that incorporates a diffractive optical network 10 and is designed using deep learning, that is capable of instantaneously reconstructing artifact-free images of unknown objects from their in-line holograms 12, without any digital computation. This all-optical computing framework that is composed of successive transmissive diffractive layers 20 generalizes very well to unseen objects, and exhibits image quality, depth-of-field and diffraction efficiency advantages compared to free-space propagation of a recorded hologram. This diffractive optical network 10 and the underlying deep learning-based design framework can find numerous applications in holographic imaging and display applications due to its reconstruction speed (driven by the propagation of light) and passive nature (operating without the need for a digital computer or an external power source, except for the illumination light).

Methods

Numerical Model of Diffractive Networks. In developing the mathematical model of a diffractive network, the transverse planes of the system is indexed by the letter l. For a diffractive network with N diffractive layers 20 between the input plane 18 and the output planes 28, l=0, 1, 2, . . . , N, N+1, where l=0 represents the input hologram plane 18 and l=N+1 represents the output (image reconstruction) plane 28. Furthermore, the complex amplitude of the optical wave before and after the optical modulation imposed by element/pixel m of a diffractive layer l is denoted by $u_m^l$ and $v_m^l$, respectively. To clarify, u is used to denote the field before modulation and v to denote the field after modulation by a diffractive layer 20, while the index in the superscript is used to represent the corresponding diffractive layer 20 and the subscript represents the individual diffractive features of that diffractive layer 20. Then, following the Rayleigh-Sommerfeld formulation of diffraction, one can write:

$$u_k^l = \sum_m \frac{z_l}{\left(r_{mk}^l\right)^2}\left(\frac{1}{2\pi r_{mk}^l} + \frac{1}{j\lambda}\right)\exp\left(j\frac{2\pi r_{mk}^l}{\lambda}\right)v_m^{l-1}$$

$$r_{mk}^l = \sqrt{(x_k - x_m)^2 + (y_k - y_m)^2 + z_l^2}$$

Here $\lambda$ is the wavelength of the optical wave; $z_l$ is the axial distance between diffractive layers l−1 and l; $(x_m, y_m)$ and $(x_k, y_k)$ are the transverse coordinates of feature m of layer l−1 and feature k of layer l, respectively; $v^0$ and $u^{L+1}$ are the optical fields at the input and the output fields-of-view of the diffractive optical network 10, respectively.

If the complex-valued transmittance of pixel k of layer l is denoted with $t_k^l$, then assuming the diffractive layers to be thin, one can write $v_k^l=u_k^l \cdot t_k^l$, which can be rewritten as:

$$v_k^l = \left(\sum_m w_{km}^l v_m^{l-1}\right) \cdot t_k^l \tag{1}$$

$$w_{km}^l = \frac{z_l}{\left(r_{mk}^l\right)^2}\left(\frac{1}{2\pi r_{mk}^l} + \frac{1}{j\lambda}\right)\exp\left(j\frac{2\pi r_{mk}^l}{\lambda}\right).$$

Eq. (1) resembles a feedforward neural network, where $w_{km}^l$ and $t_k^l$ are the analogues of weights and (multiplicative) biases, respectively. Note that the terms diffractive feature and neuron are used interchangeably in the context of diffractive networks. In contrast with digital feedforward neural networks, however, the weights $w_{km}^l$ of diffractive networks, which are constrained by free-space diffraction between the diffractive surfaces, are not trainable. Nonetheless, the multiplicative biases $t_k^l$ of the neurons are trainable since they are determined by the physical parameters of the diffractive surfaces. For example, for thin diffractive layers, the phase $\varphi_k^l$ of the complex transmittance $t_k^l$ of a diffractive layer neuron is related to its height $h_k^l$ by the equation $$\varphi_k^l = \frac{2\pi(n-1)h_k^l}{\lambda},$$

where n is the refractive index of the diffractive layer material (which is surrounded by air).

Given a training dataset of input-target pairs (x, y) specific to a desired task, the input x can be mapped to the diffractive network input optical field $v^0$, whereas the diffractive network output optical field $u^{L+1}$ is mapped to ŷ, an estimate of the target y. The amplitude and/or the phase of the complex amplitude transmittance values $t_k^l$ can be optimized by minimizing an error function between the target and the estimate, i.e., L(y, ŷ), which is achieved using standard deep learning techniques such as stochastic gradient descent and error backpropagation.

Network architecture. The hyperparameters related to the model of the diffractive optical network 10 architecture were set empirically. All the reported diffractive optical networks have 5 phase-only modulation/diffractive layers 20, and the transverse dimension of the layers are 100λ×100λ. The pixel/neuron size is set as 0.5λ×0.5λ, and the number of trainable parameters (phase values) in each diffractive optical network was 5×200×200=0.2 million. The axial/longitudinal distance between the diffractive layers 20 is set as 37.5λ. The input and output planes 18, 28 of the diffractive optical network 10 were also assumed to be 37.5λ away from the first and the last layers 20, respectively.

In computing the holograms, the object aperture (transverse dimension) was assumed to be 25λ×25λ and the recording plane was assumed to be 30λ away from the object plane. The lateral extent of the recorded holograms was limited to 42λ×42λ. All the simulations for this work were done at λ=600 nm. The results, however, are invariant to wavelength given that all the dimensions are scaled proportional to λ.

Training. For training diffractive optical networks 20 to all-optically perform holographic reconstruction, the in-line holograms 12 were computed corresponding to the training objects by numerically simulating the propagation of a plane wave scattered by the object from the object plane to the hologram recording plane. Assuming that the hologram amplitude transmittance is proportional to the recorded intensity, the input optical field $v^0$ was set to the normalized hologram intensity. The reconstructed object pattern was defined as the intensity of the output optical field $u^{L+1}$, i.e., $\hat{y} = |u^{L+1}|^2$. The training loss function (to be minimized) was defined as:

$$L = L_{pixel} + 1000L_{fourier} + \eta L_{efficiency}$$

$$L_{pixel} = \frac{1}{N_p} \sum_{p=1}^{N_p} |y_p - \hat{y}_p|$$

$$L_{fourier} = \frac{1}{N_p} \sum_{p=1}^{N_p} |F\{y\}_p - F\{\hat{y}\}_p|^2$$

$$L_{efficiency} = 1 - \frac{P_{out}}{P_{illum}}.$$

Here, y refers to the target (object image), and F{•}denotes the Fourier transform operation, $P_{illum}$ is the power of the wave illuminating the hologram and $P_{out}$ is the power over the region of interest (i.e., the reconstruction field-of-view) at the output plane. The coefficient η of the diffraction efficiency-related loss term ($L_{efficiency}$) is a training hyperparameter which can be used to control the diffraction efficiency of the resulting optical network (see FIGS. 11A, 11B). The Adam optimization algorithm was used for minimizing the loss function.

For designing the extended depth-of-field diffractive optical networks 10, the distance between the object and the hologram recording plane during the training phase was treated as a random variable $z_{train}$, drawn from a uniform distribution centered around the nominal recording distance $z_0$, i.e., $z_{train} \sim \text{Uniform}((1-\delta_{tr})z_0, (1+\delta_{tr})z_0)$ where $\delta_{tr}$ quantifies the width of the distribution. During blind testing phase, $\delta z = z_{test} - z_0$ was defined to be the deviation of the recording distance from the nominal distance.

For training the diffractive models, the MNIST handwritten digit dataset was used, augmented with an additional custom-built dataset of generic shapes, e.g., patches, circles, straight-line and circular-line gratings etc. A few examples of the images from this custom-built dataset can be found in FIG. 12. The number of images in the training dataset was 110,000 (55,000 from the MNIST training set and 55,000 from the custom prepared image dataset). None of the images used for evaluating the model performances reported herein were in the training dataset.

The model was implemented and trained using Tensor-Flow. The Rayleigh-Sommerfeld diffraction integral was computed using the Angular Spectrum method. The native TensorFlow implementation of Adam optimization algorithm was used with the default hyperparameter values, i.e., 0.001 for the learning rate, and 0.9 and 0.999 for the exponential decay rates for the first and the second moments of the gradients, respectively. The models were trained for 50 epochs with a mini-batch size of 4. The training of a model typically took ~8 hours on a GTX 1080 Ti graphics processing unit (GPU, Nvidia Inc.) on a machine running Windows 10 operating system (Microsoft Inc.).

While embodiments of the present invention have been shown and described, various modifications may be made without departing from the scope of the present invention. It should be appreciated that the diffractive optical network model may be trained with and can reconstruct holograms formed at a particular wavelength or wavelength band or a set of discrete wavelengths. The invention, therefore, should not be limited, except to the following claims, and their equivalents.

What is claimed is:

1. A method of forming a physical embodiment of a diffractive optical network that reconstructs input holograms to reveal accurate optical images, optical signals, or optical data comprising:

training with at least one computing device a diffractive optical network model formed by one or more diffractive layers to reconstruct at least one optical image, optical signal, or optical data input to the diffractive optical network as one or more holograms, the one or more diffractive layers having a plurality of optically transmissive and/or optically reflective physical features located in different locations therein or thereon, wherein the training comprises feeding an input plane of the diffractive optical network model with training holograms of optical images, optical signals, or optical data and computing an optical output of the diffractive optical network model through optical transmission and/or reflection resulting from the one or more diffractive layers and iteratively adjusting transmission and/or reflection properties for the one or more diffractive layers of the diffractive optical network model until optimized transmission/reflection coefficients are obtained to reconstruct the at least one optical image, optical signal, or optical data from the hologram(s) input to the diffractive optical network model, wherein the at least one optical image, optical signal, or optical data that is/are reconstructed is/are substantially free of twin-image noise or artifacts; and manufacturing or having manufactured a physical embodiment of the diffractive optical network model comprising one or more transmissive and/or reflective diffractive layers having physical features that match the optimized transmission/reflection coefficients obtained by the training of the diffractive optical network model.

2. The method of claim 1, wherein the optical output of the diffractive optical network model is computed at a reconstruction or observation plane or surface located at a fixed axial distance or a range of axial distances from the one or more diffractive layers.

3. The method of claim 1, wherein one or more optical detectors or an observation plane or surface is/are located at a fixed axial distance or a range of axial distances from the one or more diffractive layers as part of the physical embodiment of the diffractive optical network.

4. The method of claim 3, wherein the one or more optical detectors and/or the output observation plane or surface are used to perform an object classification decision.

5. The method of claim 1, wherein the diffractive optical network model is trained with and can reconstruct holograms formed at a particular wavelength or wavelength band or a set of discrete wavelengths.

6. The method of claim 1, wherein one or more diffractive layers of the physical embodiment of the diffractive optical network comprise reconfigurable spatial light modulators.

7. A diffractive optical network that reconstructs input holograms to reveal accurate optical images, optical signals, or optical data comprising:

one or more optically transmissive and/or reflective diffractive layers arranged in an optical path, each of the optically transmissive and/or reflective diffractive layer(s) comprising a plurality of physical features formed on or within the one or more optically transmissive and/or reflective diffractive layers and having different transmission and/or reflective properties as a function of local coordinates across each diffractive layer, wherein the one or more optically transmissive and/or reflective diffractive layers and the plurality of physical features thereon or therein collectively define a trained mapping function between (1) an input hologram containing at least one input optical image, input optical signal, or input optical data to the diffractive optical network and (2) at least one output optical image, output optical signal, or output optical data created from the one or more optically transmissive and/or reflective diffractive layers, the trained mapping function reconstructing the at least one input optical image, input optical signal, or input optical data that is/are substantially free of twin-image noise or artifacts and is/are projected onto an observation plane or surface and/or one or more optical detectors configured to see/reveal the at least one output optical image, output optical signal, or output optical data resulting from the diffractive optical network.

8. The diffractive optical network of claim 7, wherein one or more diffractive layers of the diffractive optical network comprise reconfigurable spatial light modulators.

9. The diffractive optical network of claim 7, wherein one or more diffractive layers of the diffractive optical network function as a projector of the optical image(s) and/or the optical data and/or the optical signal(s).

10. The diffractive optical network of claim 7, wherein the one or more optical detectors comprises a detector array or a focal plane array.

11. The diffractive optical network of claim 7, wherein the one or more optical detectors and/or the output observation plane or surface are located in a portable electronic device.

12. The diffractive optical network of claim 11, wherein the portable electronic device comprises a wearable device or goggles.

13. The diffractive optical network of claim 11, wherein the portable electronic device functions as a projector of the optical image(s) and/or the optical data and/or the optical signal(s).

14. The diffractive optical network of claim 7, wherein the one or more optical detectors and/or the output observation plane or surface are used to perform an object classification decision.

15. The diffractive optical network claim 7, wherein the diffractive optical network reconstructs holograms formed at a particular wavelength or wavelength band or a set of discrete wavelengths.

16. The diffractive optical network of claim 7, wherein the one or more optically transmissive and/or reflective diffractive layers are removable and/or replaceable.

17. The diffractive optical network of claim 7, wherein the optical properties of the optically transmissive and/or reflective diffractive layers change as a function of time.

\* \* \* \* \*